United States Patent [19]
Rao

[11] Patent Number: 5,513,128
[45] Date of Patent: Apr. 30, 1996

[54] MULTISPECTRAL DATA COMPRESSION USING INTER-BAND PREDICTION

[75] Inventor: Ashok K. Rao, Germantown, Md.

[73] Assignee: Comsat Corporation, Bethesda, Md.

[21] Appl. No.: 120,508

[22] Filed: Sep. 14, 1993

[51] Int. Cl.[6] .............................. H04N 11/02; H04J 15/00
[52] U.S. Cl. .................... 364/514 R; 348/384; 348/394; 370/118
[58] Field of Search .................................... 364/514, 526, 364/577, 514 R; 348/387, 388, 394, 397, 398, 409, 384; 358/426, 261.2; 370/53, 118; 375/240; 382/166, 232, 238

[56] References Cited

U.S. PATENT DOCUMENTS

| | | |
|---|---|---|
| 4,022,974 | 5/1977 | Kohut et al. . |
| 4,268,861 | 5/1981 | Schreiber et al. ...................... 348/397 |
| 4,463,372 | 7/1984 | Bennett et al. . |
| 4,468,688 | 8/1984 | Gabriel et al. . |
| 4,472,732 | 9/1984 | Bennett et al. . |
| 4,631,750 | 12/1986 | Gabriel et al. . |
| 4,908,874 | 3/1990 | Gabriel . |
| 4,941,193 | 7/1990 | Barnsley et al. . |
| 5,046,108 | 9/1991 | Inoue et al. . |
| 5,065,447 | 11/1991 | Barnsley et al. . |
| 5,072,290 | 12/1991 | Yamagami et al. ...................... 348/396 |
| 5,175,808 | 12/1992 | Sayre . |
| 5,214,504 | 5/1993 | Toriu et al. . |

OTHER PUBLICATIONS

"Manual of Remote Sensing", Robert N. Colwell, second edition, vol. 1, pp. 745–792.

"Feature Predictive Vector Quantization of Multispectral Images", S. Gupta and A. Gersho IEEE, vol. 30, No. 3, May 1992.

*Primary Examiner*—Emanuel T. Voeltz
*Assistant Examiner*—Edward Pipala
*Attorney, Agent, or Firm*—Sughrue, Mion, Zinn, Macpeak & Seas

[57] ABSTRACT

A method for compressing a multi-spectral data stream corresponding to an image for a selected one of transmission, as a limited bandwidth transmission using a predetermined band, and data storage includes steps for dividing the image into pixel blocks P in each of N bands, where both P and N are integers greater than one, selecting one of pixel blocks in one of N bands as an anchor band and computing prediction coefficients for relating intensities of each pixel in each P pixel block in the remaining N−1 bands based on the anchor band. A codec apparatus is also described.

10 Claims, 2 Drawing Sheets

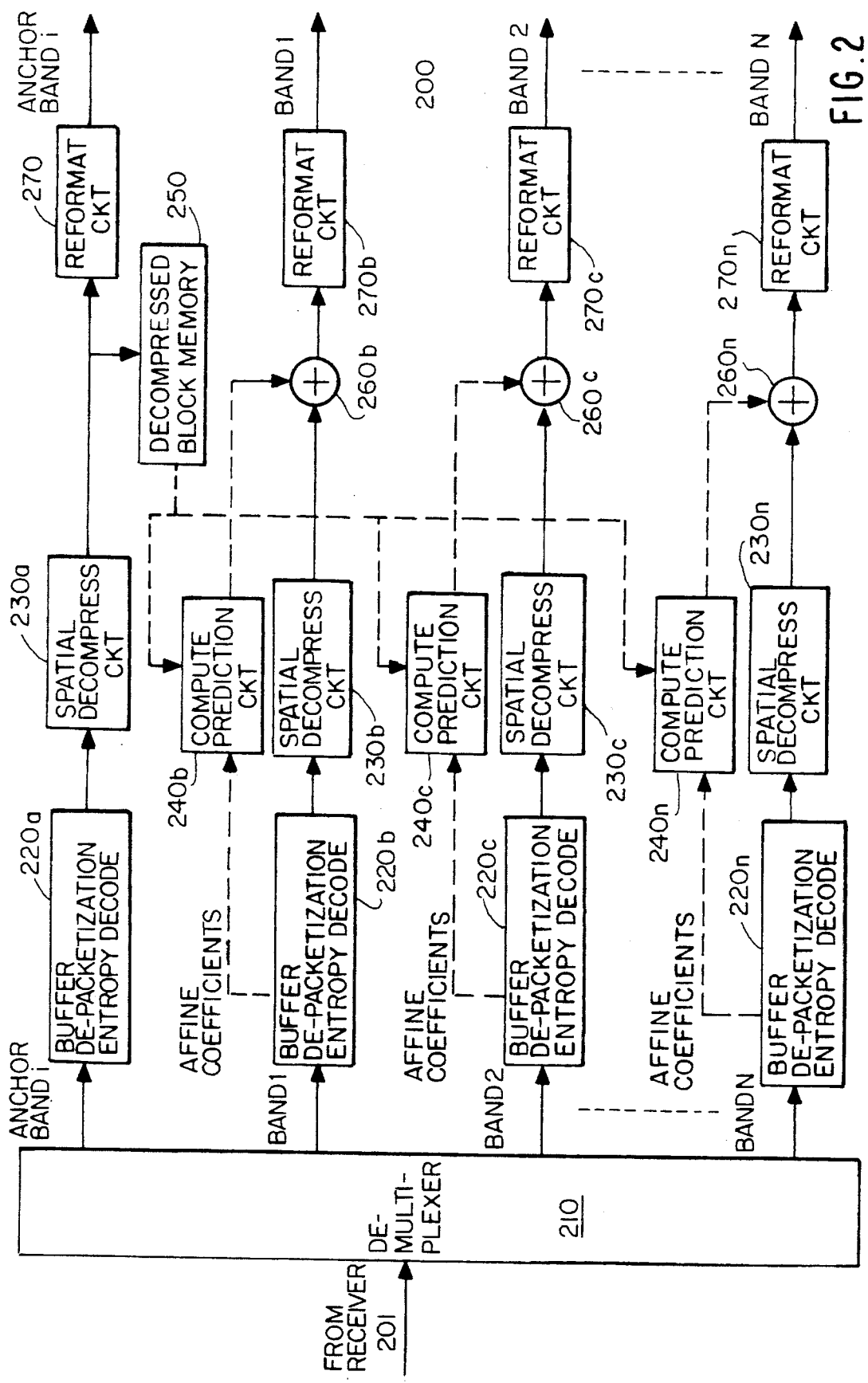

MULTISPECTRAL DATA COMPRESSION USING INTER-BAND PREDICTION

FIELD OF THE INVENTION

The present invention relates generally to systems for transmitting information between satellites and ground stations. More specifically, the present invention relates to codecs for use in satellite communications for compressing and decompressing N–1 bands of information based on information contained in an Nth band of a video signal.

BACKGROUND OF THE INVENTION

The sensors aboard present day and proposed remote sensing spacecraft can produce prodigious amounts of information which have to be transmitted on a limited bandwidth cross-link or down-link channel. For example, the Landsat Multi-Spectral Scanner (MSS) system produces 4 bands of data at a data rate of about 28 million pixels per scene. The data produced are transmitted at a rate of 15 Mbit/s using S-band transmission. The Thematic Mapper (TM), on the other hand, produces 7 bands of information at a data rate of about 231 million pixels per scene, which TM data are transmitted at 85 Mbit/s via X-band transmission. The Earth Observing System (EOS), which is scheduled to begin operation in the late 1990s, will carry a High Resolution Imaging Spectrometer (HIRIS) designed to acquire images in 192 spectral bands. The HIRIS system is expected to produce a maximum output data rate of 300 Mbit/s.

It will be appreciated that not only do the high data rates pose a formidable communications problem, but they also impose a severe strain on the ground data storage and manipulation facilities. It will also be noted that data compression of some sort would alleviate these problems in present and future remote sensing systems.

Methods for manipulating image data have long been known. Such methods generally fall into two categories, methods for spatial image transformation and methods for spatial image compression. Whether image translation or image compression is being performed, mathematical transforms, e.g., affine transforms, have been employed. It will be appreciated that the classic affine transform is used to map pixels in one location onto another location. For example, U.S. Pat. No. 4,908,874 discloses classic spatial manipulation using an affine transform, while U.S. Pat. No. 5,214,504 uses affine transforms for interpolation of interframe pixel locations. U.S. Pat. Nos. 4,631,750, 4,463,372, 4,468,688, 4,472,732, 5,046,108 and 5,175,808 disclose additional applications of the affine transform to spatial image transformation.

Affine transformations have also found their way into various spatial image compression methods. U.S. Pat. No. 4,941,193, for example, describes iterative affine transforms for compressing images using fractal modeling while U.S. Pat. No. 5,065,447 further describes affine transformations leading to a fractal transform technique.

Adaptive linear prediction has also been employed in speech synthesis as described in U.S. Pat. No. 4,022,974.

SUMMARY OF THE INVENTION

The principal purpose of the present invention is to provide a more efficient method for compression of multi-spectrum images.

It is one object of the present invention to provide an apparatus for encoding a first band of multi-spectrum data using a second band of data related by a predictive transform. According to one aspect of the invention, a selected one of an affine transform and a modified affine transform may be employed as the predictive transform.

In remote sensing, images of the earth or atmosphere are collected by sensors onboard a spacecraft. In case of multispectral remote sensing, image data in different optical bands is collected. This invention exploits the correlation between the data in different bands to reduce the amount of data being transmitted back to earth. While the low complexity nature of this method makes it particularly attractive for on-board implementations, the method advantageously can be used effectively for data compression of multispectral data archives on earth.

These and other objects, features and advantages of the invention are provided by a method for compressing a multi-spectral data stream corresponding to an image for a selected one of transmission as a limited bandwidth transmission using a predetermined band and data storage. The method includes steps for dividing the image into pixel blocks P in each of N bands, where both P and N are integers greater than one, selecting one of pixel blocks in one of N bands as an anchor band and computing prediction coefficients for relating intensities of each pixel in each P pixel block in the remaining N–1 bands based on the anchor band.

These and other objects, features and advantages of the invention are disclosed in or apparent from the following description of preferred embodiments.

BRIEF DESCRIPTION OF THE DRAWINGS

The preferred embodiments are described with reference to the drawings in which like elements are denoted by like or similar numbers and in which:

FIG. 2 is a high level block diagram which is useful in explaining the operation of a decoder according to the present invention.

DESCRIPTION OF THE PREFERRED EMBODIMENTS

Figure 1:
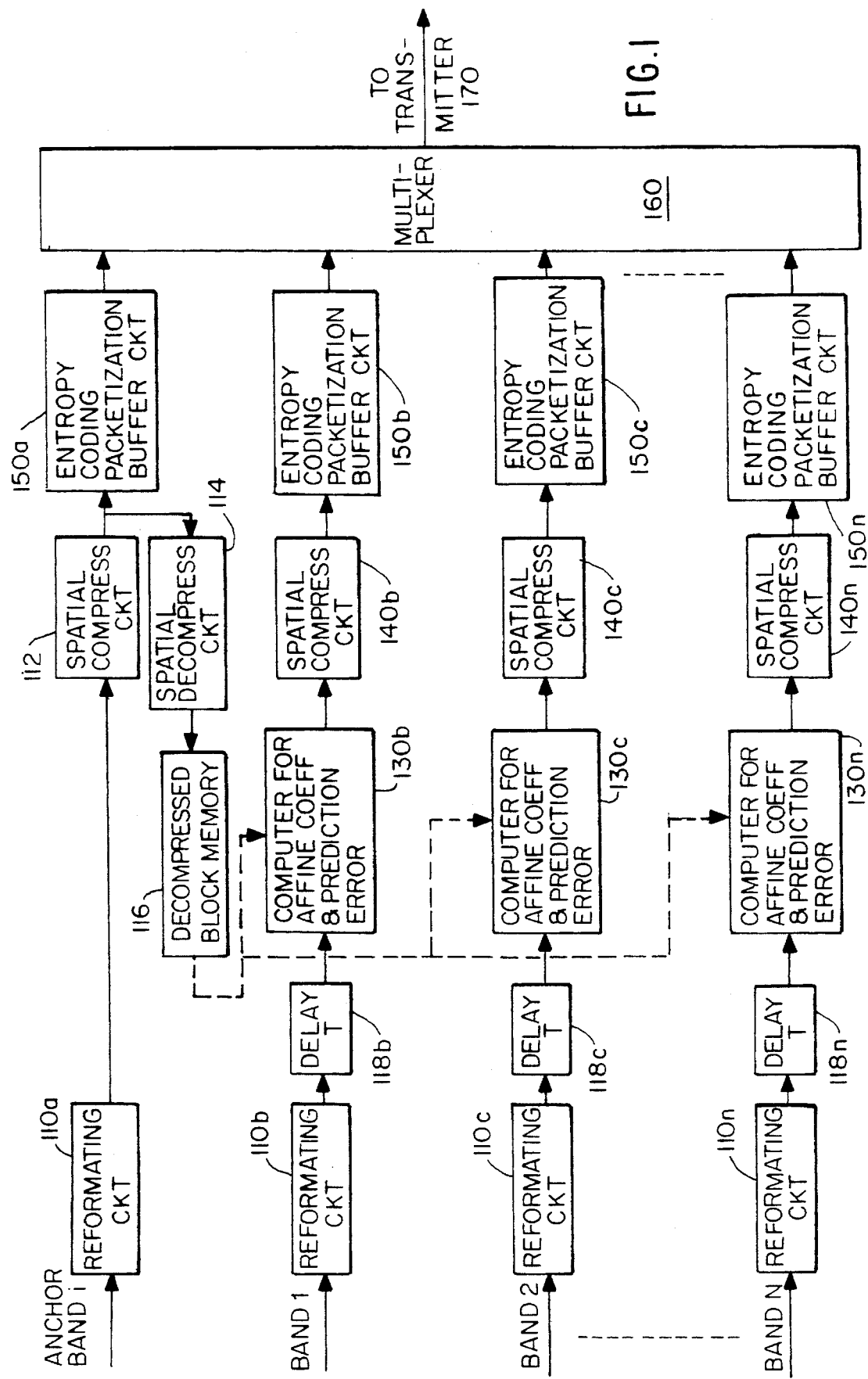
FIG. 1 is a high level block diagram which is useful in explaining the operation of an encoder according the present invention.

Before discussing the preferred embodiment of the present invention, a brief discussion of the applicable theory leading to the present invention will be presented.

Multi-spectral data is characterized by a high degree of correlation in both the spectral and the spatial domains. The correlation between different bands is in part due to the spectral overlap of the sensors, and because the reflectance from the ground often occupies a wide band of frequencies. Not surprisingly, neighboring bands often advantageously have the maximum amount of correlation. Homogeneous ground features lead to pixels with similar intensity values within the band which, in turn, causes high spatial correlation between many of the bands. Data compression advantageously can be achieved by removing both the redundancy between the different bands and the redundancy within each band.

Previously used methods for multispectral data compression either explicitly or implicitly employed a two stage procedure. More specifically, the spectral correlation is removed in the first stage while the spatial correlation is exploited during the second stage. In the two-stage procedure, one of a variety of powerful yet easily implementable spatial coding schemes is used for second stage signal processing.

Block transform methods have been suggested, e.g., in the work entitled *Manual of Remote Sensing*, American Society of Photogrammetry, Falls Church, Va. (1983), for spectral compression. The different spectral bands are de-correlated by transforming the data set into a set of coefficients with little or no correlation. A number of transforms can be used to de-correlate the data but the Karhunen-Loeve Transform (KLT) method is the optimal transform in the sense that the transform coefficients are completely uncorrelated. The scheme works as follows:

(1) The sample inter-band covariance matrix of the data set is first calculated and its eigenvectors and eigenvalues are extracted;

(2) The eigenvectors are then ordered in terms of decreasing eigenvalues; and (3) A transform matrix T is formed with its rows being the ordered eigenvectors.

This transform matrix can now be used to obtain the coefficient vector K at each location (x,y) as $$K(x,y) = TI(x,y) \tag{1}$$

wherein I(x,y) is a vector containing the intensity of the pixels of all the bands at location (x,y). The coefficient vector K has the property that many of its high order components are small in magnitude since the process of decorrelation causes energy compaction. Some amount of data compression can be achieved at this stage by discarding the high order components of each transform vector. Even if all the components are retained, the number of bits required to represent the transformed bands will be significantly lower than that required for the original bands.

A subtle drawback with the KLT method is the use of a single covariance matrix and consequently the same transform matrix T for all regions of the image. Generally speaking, images are non-stationary and better results can be obtained, as discussed in greater detail below, by tailoring the transform to each of the different regions or blocks of the image. This could improve the compaction performance, albeit at the expense of an increase in the overhead for transmitting the transform matrix for each block. The main disadvantage with the KLT method, however, is the significant complexity involved in the computation of the covariance matrix and in extraction of the eigenvalues and eigenvectors. This has discouraged the use of the KLT method for use in real-time applications.

Multi-spectral data is created by objects or ground material reflecting or emitting different amounts of electromagnetic energy at different wavelengths. Homogeneous ground features advantageously can create pixels whose intensities in different bands are related by multiplicative factors. It was noted that classic affine transforms relate pixels in one location to pixels in another location but do not consider the relationship between the intensity of image signals at one pixel location in a variety of bands. Thus, inter-spectral correlation advantageously can be approximated by a simple model, e.g., a linear regression, linking the intensity of pixels in one band with those of another band.

This conclusion provided the motivation for the development of a new spectral compression scheme based on inter-band prediction. Unlike the KLT method described above, the computational complexity of this predictive compression method can be very low so that an on-board implementation in a satellite becomes feasible. By its nature, the method is block-adaptive so that it can take into account the non-stationarities in the data for the different bands.

According to the present invention, the image to be stored or transmitted is preferably split into blocks of WxW pixels. The intensities of the pixels in a block in one band advantageously are related to those in another band by the transform:

$$I_j(x,y,p) = \alpha_{jk}(p) I_k(x,y,p) + \beta_{jk}(p) \tag{2}$$

for all x,y in block p, where $I_j$ (x,y,p) is the intensity of each pixel in block p of band j; $\alpha_{jk}$ (p) is the multiplying factor and $\beta_{jk}$ (p) is the additive factor in the predictive transform relating block p in bands j and k.

Preferably, a simple least-squares based scheme can be used in obtaining the $\alpha_{jk}$ and $+\beta_{jk}$ coefficients for different blocks. In an exemplary case, the least-squares regression of equations (3) and (4):

$$\alpha = \frac{M^2 \sum_{x=1}^{M} \sum_{y=1}^{M} I_j(x,y) I_i(x,y) - \sum_{x=1}^{M} \sum_{y=1}^{M} I_j(x,y) \sum_{x=1}^{M} \sum_{y=1}^{M} I_i(x,y)}{M^2 \sum_{x=1}^{M} \sum_{y=1}^{M} I_i^2(x,y) - \left( \sum_{x=1}^{M} \sum_{y=1}^{M} I_i(x,y) \right)^2} \tag{3}$$

$$\beta = \frac{\sum_{x=1}^{M} \sum_{y=1}^{M} I_j(x,y)}{M^2} - \alpha \frac{\sum_{x=1}^{M} \sum_{y=1}^{M} I_i(x,y)}{M^2} \tag{4}$$

advantageously can be used. It should be noted that $I_j$ (x,y) is the intensity of the pixel at position (x,y) in Anchor Band i, $I_j$(x,y) is the intensity of the pixel at position (x,y) in Band j and M is the width of the block. The least-squares determination advantageously yields a compact and easily computed representation for the inter-band dependency.

It should be noted that a comparable matrix based affine model was reported in the paper by S. Gupta et al., entitled "Feature Predictive Quantization of Multispectral Images" IEEE Transactions on Geoscience and Remote Sensing, Vol. 30, No. 3, pp. 491–501 (May 1992), which model was used to develop a predictive vector quantization method for multispectral images. In contrast to the present invention, the model uses an WxW affine transform matrix, where W is the block size, to model the entire image. The significant advantage of using different simple affine models for different areas of each image, which more accurately models the non-stationarities in the image data, is not recognized by Gupta et al.

The preferred embodiment according to the present invention will now be described while referring to FIGS. 1 and 2.

FIG. 1 is a high level block diagram of an encoder suitable for use in a spacecraft and forms part of a codec, e.g., a coder-decoder pair. As indicated in FIG. 1, it is assumed throughout the discussion that Band i is the anchor band and that each of the other bands, Band 1, Band 2 . . . , Band N are predicted with respect to Anchor Band i.

Encoder 100 includes a plurality of reformatting circuits, generally denoted 110, for separating each of the incoming bandwidth signals into a plurality of pixels, which pixels can advantageously can be arranged in a rectangular matrix. The output of circuit 110a, corresponding to Anchor Band i, is provided to a spatial compression circuit 112. Compression circuit 112 advantageously can be implemented as a discrete cosine transform (DCT) compression circuit. Those of ordinary skill in the art will appreciate that vector quantization, in an exemplary case, can also be used. It should also be noted that the invention is not limited to either DCT or vector quantization encoding.

The output of spatial compression circuit 112 is provided to a spatial decompression circuit 114. This circuit advantageously can implement an inverse DCT function, as well known to those of ordinary skill in the art. The output of circuit 114 is provided to a decompressed block memory 116 for storing and providing one block of the incoming data stream for Anchor Band i for the signal processing of each of the remaining bands.

An exemplary case regarding processing of Band 1 will now be discussed. It will be appreciated that irrespective of the number of bands, the processing for each band with respect to Anchor Band i is identical. Thus, only encoding of Anchor Band i and Band 1 will be described in the interest of brevity.

Band 1 is input to reformatting circuit 110b, which is substantially similar to reformatting circuit 110a. The output of circuit 110b is provided to a delay 118b, which is provided for delaying the input signal from Band 1 until a corresponding signal for Anchor Band i is stored in memory 116. A computer 130b receives both the delayed form of Band 1 and the stored form of Anchor Band i and computes prediction coefficients $\alpha$ and $\beta$ relating the intensity of Anchor Band i to Band 1.

It will be appreciated that a prediction error is also generated by applying prediction coefficients to the signal stored in memory 116. The difference between this generated signal and the signal stored in memory 116 is computed and the output of the prediction signal computation is subtracted to generate the prediction error signal. The prediction error signal is provided to a spatial compression circuit 140b, which advantageously can be a DCT spatial compression circuit. The signal corresponding to Anchor Band i and Band 1 are respectively processed in additional processing circuit 150a and 150b, which provides entropy coding, packetization and buffering, which processes are well understood by those of ordinary skill in the art and which processes will not be discussed further.

The output of circuits 150a and 150b are applied to a multiplexer 160 and the resultant signal is output to a transmitter 170 aboard the satellite.

Referring to FIG. 2, a ground station 200 includes a receiver 201 connected to multiplexer 210 used to produce signals corresponding to the recovered Anchor Band i and corresponding to recovered Band 1, recovered Band 2 . . . , recovered Band N. Each of these bands is provided to a buffering, depacketization and an entropy decoding circuit, generally denoted 220, which circuitry forms no part of the present invention and is well within the skill of those of ordinary skill in the art. It will be noted that circuit 220b–220n include structure for separating prediction coefficients from the encoded data.

The output of circuit 220 is provided to a spatial decompression circuit, generally denoted 230. Preferably, spatial decompression circuit 230 includes an inverse DCT transform circuit. The output of spatial decompression circuit 230a is provided to a decompressed memory block 250.

Again referring to the structure shown to respect to Band 1, the output of circuit 220b is provided to a spatial decompression circuit 230b for decompression of the prediction error signal. At the same time, the prediction coefficients provided to prediction circuits 240b, along with the recovered portion of Anchor Band i stored in memory 250 are used to compute the predicted signal. The predicted signal advantageously is input to an adder 260b, which receives the recovered, e.g., decompressed, prediction error signal. As well known to those of ordinary skill in the art, the prediction error signal added to predicted signal is used to generate the recovered Band 1 signal, which signal is then reformatted in reformatting circuit 270b to recover the original structure.

According to the present invention, one band advantageously is chosen as the anchor band and is used be used to predict the other bands using predictive transforms. It will be appreciated that the choice of the anchor band could be made in a variety of ways. In an exemplary case, the anchor band could be chosen on a block-by-block basis, as opposed to once for an image. The anchor band blocks would then be compressed using a spatial block-coding algorithm such as the Discrete Cosine Transform or Vector Quantization.

The parameters of the optimal predictive transformation linking a block in the anchor band to blocks in the other bands could advantageously be determined using the simple least-squares approach described with respect to Equations (3) and (4), above.

It should also be noted that parameter estimation advantageously could be performed using either the original anchor block or the decompressed version. Preferably, the optimal parameters for each block could then be used, along with the decompressed anchor block, to predict blocks in the other bands using Equation (2).

In another exemplary case, the prediction errors of each block in the non-anchor bands advantageously could be compared with a threshold. For large prediction errors, e.g., errors above a predetermined threshold, the block would be compressed using the spatial coding technique. When an intermediate level prediction error, e.g., an error level substantially equal to the threshold, is produced, the block prediction error would be compressed using the spatial coding technique. For relatively small values of prediction error, no further coding would be performed, i.e., only the prediction coefficients need be transmitted. It should immediately be noted that the use of at least one threshold would allow for preservation of spectral information with specified levels of accuracy.

Additional modifications to the basic method and apparatus advantageously can yield significant improvements. For example, instead of using a single anchor band to predict the other bands, two or more bands could be used to form the prediction. These multiple anchor bands could themselves be coded using predictions from one major anchor band. Another possibility would be to generalize the factors $\alpha$ and $\beta$ to an affine transform matrix which would relate micro-blocks of pixels in a bigger block in a band to co-located micro-blocks in other bands. This would, of course, increase the hardware complexity and the number of prediction coefficients to be transmitted.

Computer simulations have shown that the method according to the present invention provides an improved compression ratio of almost 2:1 over conventional compression methods with no loss. Additional simulations indicate that much higher compression ratios are possible when used in conjunction with a lossy spatial compression scheme.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A method of compressing a multi-spectral data stream corresponding to an image for a selected one of transmission, as a limited bandwidth transmission using a predetermined band, and data storage, said method comprising the steps of:

(a) dividing said image into a plurality of pixel blocks P in each of a plurality of N bands, where both P and N are integers greater than one;

(b) selecting one of said N bands as an anchor band; and (c) computing prediction coefficients for relating intensities of each respective pixel in each of said P pixel blocks in each remaining one of N−1 bands to corresponding pixel in said anchor band.

2. The method of compressing a multi-spectral data stream as recited in claim 1, wherein said method further comprises the step of:

(d) spatially compressing one of said P pixel blocks in said anchor band; and wherein said step (c) further comprises:

(c) computing prediction coefficients for relating compressed information related to the intensities of each said pixel of said each of said P pixel blocks in each of said N−1 bands to said corresponding pixel in said anchor band.

3. The method of compressing a multi-spectral data stream as recited in claim 2, wherein said step (c) further comprises the step of:

(c) computing prediction coefficients for relating compressed information related to said intensities of each said pixel of said each of said P pixel blocks in each of said N−1 bands to said corresponding pixel in said anchor band using the formula $$I_j(X,Y,P) = \alpha_{jk}(P) I_k(X,Y,P) + \beta_{jk}(P)$$

for all X,Y in a Pth block P, wherein $I_j(X,Y,P)$ is intensity of one pixel of pixel block P in a band j, $\alpha_{jk}(P)$ is a multiplying factor, and $\alpha_{jk}(P)$ is an additive factor in a predictive transform relating block P in said anchor band k and said band j, where band j is one of said N−1 bands.

4. The method of compressing a multi-spectral data stream as recited in claim 1, wherein said step (c) further comprises the step of:

(c) computing prediction coefficients for relating said intensities of each said pixel of said each of said P pixel blocks in each of said N−1 bands to said corresponding pixel in said anchor band using the formula $$I_j(X,Y,P) = \alpha_{jk}(P) I_k(X,Y,P) + \beta_{jk}(P)$$

for all X,Y in a Pth block P, wherein
$I_j(X,Y,P)$ is intensity of one pixel of pixel block P in a band j, $\alpha_{jk}(P)$ is a multiplying factor, and $\beta_{jk}(P)$ is an additive factor in a predictive transform relating block P in said anchor band k and said band j, where band j is one of said N−1 bands.

5. The method of compressing a multi-spectral data stream as recited in claim 1, wherein said step (c) further comprises the step of:

(c) computing prediction coefficients for relating said intensities of each said pixel of said each of said P pixel blocks in each of said N−1 bands to said corresponding pixel in said anchor band using least-squares determination of said prediction coefficients.

6. The method of compressing a multi-spectral data stream as recited in claim 1, wherein said step (b) further comprises the step of:

(b) selecting one of said N bands including a respective one of said P pixel blocks as an anchor band so as to permit said anchor band to be freely selected from any of said N bands each time a new one of said P pixel blocks is to be processed.

7. The method of compressing a multi-spectral data stream as recited in claim 1, wherein said method further comprises the step of:

(e) when prediction errors between corresponding P pixel block values generated using said prediction coefficients and said P pixel block values of said anchor band exceed a predetermined threshold, spatially compressing said corresponding P pixel block in said anchor band.

8. A multi-spectral compression system for compressing a data stream corresponding to an image for transmission using a predetermined band, said data stream being arranged into P pixel blocks in each of N bands to thereby form P×N data blocks, wherein P and N are integers greater than 1 and wherein one of said N bands is selected as an anchor band, comprising:

a computer for computing prediction coefficients for each of said P pixel blocks in each one of remaining N−1 bands; and a multiplexer for mixing a portion of said data stream corresponding to said anchor band with respective said prediction coefficients of said remaining N−1 bands, thereby producing a multi-spectral compressed signal.

9. The multi-spectral compression system as recited in claim 8, wherein said computer computes said prediction coefficients using the formula $$I_j(X,Y,P) = \alpha_{jk}(P) I_k(X,Y,P) + \beta_{jk}(P)$$

for all X,Y in a Pth block P, wherein $I_j(X,Y,P)$ is intensity of one pixel of pixel block P in a band j, $\alpha_{jk}(P)$ is a multiplying factor, and $\beta_{jk}(P)$ is an additive factor in one of a plurality of predictive transforms relating block P in said anchor band k and said band j, where said band j is one of said remaining N−1 bands.

10. A multi-spectral transmission system for compressing a data stream corresponding to an image for transmission on a predetermined band, said data stream being arranged into P pixel blocks in each of N bands to thereby form P×N data blocks, wherein P and N are integers greater than 1 and wherein one of said N bands is selected as an anchor band, said system comprising:

a transmitter including:
a first computer for computing prediction coefficients for each of said P pixel blocks in each one of remaining N−1 bands; and
a multiplexer for mixing a portion of said data stream corresponding to said anchor band with respective said prediction coefficients of said remaining N−1 bands; and a receiver including:
a demultiplexer for generating a plurality of band signals corresponding to said N bands, said band signals comprising a recovered anchor band and a plurality of recovered prediction coefficients; and
a second computer for computing signal content of each of recovered remaining N−1 bands based on respective recovered prediction coefficients and said recovered anchor band.

* * * * *